(12) United States Patent
Ziegler et al.

(10) Patent No.: US 8,574,414 B2
(45) Date of Patent: Nov. 5, 2013

(54) COPPER PRERINSE FOR ELECTRODEPOSITABLE COATING COMPOSITION COMPRISING YTTRIUM

(75) Inventors: Terri Ziegler, Cranberry Township, PA (US); Mark McMillen, Cabot, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 317 days.

(21) Appl. No.: 12/835,788

(22) Filed: Jul. 14, 2010

(65) Prior Publication Data

US 2012/0015207 A1 Jan. 19, 2012

(51) Int. Cl.
*B01D 57/02* (2006.01)

(52) U.S. Cl.
USPC ........... 204/489; 204/471; 204/491; 204/499; 204/500; 204/501; 204/502; 204/503; 204/504; 204/505; 204/506; 204/507; 204/508; 204/509; 204/510; 205/50; 205/122; 205/205; 205/210; 205/218; 205/229; 205/316; 205/317; 205/320; 205/323

(58) Field of Classification Search
USPC ......... 204/471, 489, 491, 499, 500, 501, 502, 204/503, 504, 505, 506, 507, 508, 509, 204/510; 205/50, 122, 205, 210, 217, 218, 205/229, 316, 317, 320, 323
See application file for complete search history.

(56) References Cited

U.S. PATENT DOCUMENTS

| | | | |
|---|---|---|---|
| 5,306,765 A | 4/1994 | Kuriyama et al. | |
| 5,318,681 A | 6/1994 | Murase et al. | |
| 6,190,525 B1 * | 2/2001 | Karabin et al. | 204/489 |
| 7,803,958 B2 | 9/2010 | Gonzalez et al. | |
| 2004/0069637 A1 * | 4/2004 | Eswarakrishnan et al. | 204/489 |
| 2005/0025991 A1 | 2/2005 | Ishizuka et al. | |
| 2006/0042949 A1 * | 3/2006 | McCollum et al. | 204/471 |
| 2008/0145678 A1 * | 6/2008 | McMurdie et al. | 428/457 |
| 2009/0084682 A1 * | 4/2009 | McMillen et al. | 205/50 |
| 2009/0101512 A1 | 4/2009 | Kubota | |
| 2009/0111916 A1 * | 4/2009 | Eswarakrishnan et al. | 524/80 |
| 2009/0208716 A1 | 8/2009 | Kaneko et al. | |
| 2009/0266714 A1 | 10/2009 | Kaneko et al. | |
| 2010/0159258 A1 * | 6/2010 | Rakiewicz et al. | 428/457 |
| 2010/0187117 A1 | 7/2010 | Lingenfelter et al. | |

FOREIGN PATENT DOCUMENTS

| | | |
|---|---|---|
| WO | 0064991 A1 | 11/2000 |
| WO | 2006109862 A1 | 10/2006 |
| WO | 2008127744 A2 | 10/2008 |
| WO | 2009455568 A2 | 4/2009 |
| WO | 2010088250 A1 | 8/2010 |

* cited by examiner

*Primary Examiner* — Bruce Bell
(74) *Attorney, Agent, or Firm* — Alicia M. Passerin

(57) ABSTRACT

A method includes (a) contacting at least a portion of a substrate material with a solution comprising a source of copper, wherein the solution is essentially free of a source of a group IIIB metal and a source of a group IVB metal; and (b) after step (a), contacting at least a portion of the substrate with an electrodepositable coating composition comprising (i) a film-forming resin and (ii) a source of yttrium.

20 Claims, No Drawings

COPPER PRERINSE FOR ELECTRODEPOSITABLE COATING COMPOSITION COMPRISING YTTRIUM

BACKGROUND OF THE INVENTION

1. Field of the Invention

The present invention relates generally to a prerinse for a yttrium-containing electrodepositable coating composition.

2. Background Information

Electrodeposition as a coating application method involves depositing an electrodepositable coating composition onto a conductive substrate, which is under the influence of an applied electrical potential. Electrodeposition has become increasingly important in the coatings industry because, by comparison with non-electrophoretic coating means, electrodeposition offers increased paint utilization, improved corrosion protection, and low environmental contamination.

During electrodeposition, the electrodepositable coating composition is deposited onto a substrate that has been pretreated with a pretreatment solution, such as a zinc phosphate pretreatment solution, prior to the electrodeposition process. The pretreatment step may provide an additional degree of corrosion protection to the substrate material as compared with untreated substrates. Elimination of the pretreatment step prior to the electrodeposition process would reduce the costs associated with coating a substrate as well as eliminate any chemical byproducts that are produced during the pretreatment step. Moreover, in an automotive OEM factory setting, elimination of the pretreatment equipment would mean that the size of the factory could potentially be scaled down or that valuable factory space could be reclaimed.

One approach to this problem is to modify the composition of the electrodepositable coating to include materials that provide corrosion resistance to the substrate material without the need for a pretreatment step. For example, the element yttrium, added to conventional electrodeposition coatings, has been found to provide improvement in corrosion protection to cold rolled steel ("CRS") without the need for a pretreatment step. To further improve adhesion and to limit the amount of yttrium in the electrodeposition coating, as provided in U.S. patent application Ser. No. 12/693,626, which is herein incorporated by reference, a yttrium-containing electrodepositable coating composition that does not require a pretreatment included a film-forming polymer, yttrium, and a silane material in various forms.

The present invention is directed to a method for further enhancing corrosion protection to non-pretreated substrates coated with a yttrium-containing electrodepositable coating composition.

SUMMARY OF THE INVENTION

A method includes (a) contacting at least a portion of a substrate material with a solution comprising a source of copper, wherein the solution is essentially free of a source of a group IIIB metal and a source of a group IVB metal; and (b) after step (a), contacting at least a portion of the substrate with an electrodepositable coating composition comprising (i) a film-forming resin and (ii) a source of yttrium.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Plural encompasses singular and vice versa. As used herein, "plurality" means two or more.

As used herein, "includes" and like terms means "including without limitation."

When referring to any numerical range of values, such ranges are understood to include each and every number and/or fraction between the stated range minimum and maximum.

As used herein, "molecular weight" means weight average molecular weight ($M_w$) as determined by Gel Permeation Chromatography.

As used herein, the term "cure" refers to a coating wherein any crosslinkable components of the composition are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

As used herein, the term "essentially free" refers to a chemical composition containing less than about 10 ppm of the referenced component. Thus, for example, an electrodepositable coating composition that is "essentially free" of a particular material (such as a group III or group IV metal) is intended to not contain the particular material, but may include small portions of such material as an impurity to an added component to the electrodepositable coating composition or as being inadvertently included during the manufacturing or application process.

Reference to any monomer(s) herein refers generally to a monomer that can be polymerized with another polymerizable compound such as another monomer or polymer. Unless otherwise indicated, it should be appreciated that once the monomer components react with one another to form the compound, the compound will comprise the residues of the monomer components.

Substrate

Suitable substrates that can be coated with the yttrium-containing electrodepositable coating compositions of the present invention include, without limitation, metal substrates, metal alloy substrates, and/or substrates that have been metallized, such as nickel plated plastic. In some embodiments, the metal or metal alloy can be aluminum and/or steel. For example, the steel substrate could be cold rolled steel, electrogalvanized steel, and hot dipped galvanized steel. Moreover, in some embodiments, the substrate may comprise a portion of a vehicle such as a vehicular body (e.g., without limitation, door, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks.

In certain embodiments, the electrodepositable coating composition of the present invention is applied over a bare (i.e., non-pretreated) substrate.

Cleaning and Copper Prerinse

The suitable bare substrate materials, preferably in the form of a panel, were preferably cleaned by spraying with a solution of an alkaline cleaner to remove any oils or other debris. Chemkleen 166 m/c, an alkaline cleaner available from PPG Industries, is one exemplary alkaline cleaner. After alkaline cleaning, the bare substrate materials were rinsed thoroughly with deionized water.

Next, a solution may be brought into contact with the bare substrate material by any of a variety of techniques, including, for example, dipping or immersion, spraying, intermittent spraying, dipping followed by spraying, spraying followed by dipping, brushing, or roll-coating. In certain embodiments, a dipping or immersion technique is used and the solution, when applied to the metal substrate, is at a temperature ranging from about room temperature to a slightly elevated temperature of up to about 140 degrees Fahrenheit (about 15 to 60 degrees Celsius). The contact time is often from 10 seconds to five minutes, such as 30 seconds to 2 minutes. After removal of the bare substrate from the solution, the substrate may, if desired, be rinsed with water and dried.

The solution referenced above is often an aqueous solution of a water soluble copper compound. The solution may hereinafter be referred to as a solution or a copper prerinse solution. Specific examples of water soluble copper compounds, which are suitable for use in the present invention include, but are not limited to, copper cyanide, copper potassium cyanide, copper sulfate, copper nitrate, copper pyrophosphate, copper thiocyanate, disodium copper ethylenediaminetetraacetate tetrahydrate, copper bromide, copper oxide, copper hydroxide, copper chloride, copper fluoride, copper gluconate, copper citrate, copper lauroyl sarcosinate, copper formate, copper acetate, copper propionate, copper butyrate, copper lactate, copper oxalate, copper phytate, copper tartarate, copper malate, copper succinate, copper malonate, copper maleate, copper benzoate, copper salicylate, copper aspartate, copper glutamate, copper fumarate, copper glycerophosphate, sodium copper chlorophyllin, copper fluorosilicate, copper fluoroborate and copper iodate, as well as copper salts of carboxylic acids in the homologous series formic acid to decanoic acid, copper salts of polybasic acids in the series oxalic acid to suberic acid, and copper salts of hydroxycarboxylic acids, including glycolic, lactic, tartaric, malic and citric acids.

In certain other embodiments, the water soluble copper compound is copper sulfate or copper nitrate. Still in other embodiments, the water soluble copper compound is a mixture of water soluble copper compounds such as a mixture of copper nitrate and copper sulfate.

In certain embodiments, the copper compound is added as a copper complex salt such as $K_3Cu(CN)_4$ or Cu-EDTA, which can be present stably in the solution on its own, but it is also possible to form a copper complex that can be present stably in the solution by combining a complexing agent with a compound that is difficulty soluble on its own. Examples thereof include a copper cyanide complex formed by a combination of CuCN and KCN or a combination of CuSCN and KSCN or KCN, and a Cu-EDTA complex formed by a combination of $CuSO_4$ and EDTA.2Na.

With regard to the complexing agent, a compound that can form a complex with copper ions can be used; examples thereof include inorganic compounds, such as cyanide compounds and thiocyanate compounds, and polycarboxylic acids, and specific examples thereof include ethylenediaminetetraacetic acid, salts of ethylenediaminetetraacetic acid, such as dihydrogen disodium ethylenediaminetetraacetate dihydrate, aminocarboxylic acids, such as nitrilotriacetic acid and iminodiacetic acid, oxycarboxylic acids, such as citric acid and tartaric acid, succinic acid, oxalic acid, ethylenediaminetetramethylenephosphonic acid, and glycine.

In certain embodiments, the electrodepositive copper metal is included in the solution in an amount of at least 1 part per million ("ppm"), such as at least 50 ppm, or, in some cases, at least 100 ppm of total copper metal (measured as elemental copper). In certain embodiments, the copper metal is included in the solution in an amount of no more than 5,000 ppm, such as no more than 1,000 ppm, or, in some cases, no more than 500 ppm of total copper metal (measured as elemental copper). The amount of electropositive copper metal in the solution can range between any combination of the recited values inclusive of the recited values. In certain embodiments, the copper metal included in the solution is between about 5 and 100 ppm of total copper metal (measured as elemental copper), based on the total weight of ingredients in the solution In addition to the water soluble copper compound and optional complexing agent, the solution utilized in certain embodiments of the present invention may also include other additives. For example, a stabilizer, such as 2-mercaptobenzothiazole, may be used. Other optional materials include surfactants that function as defoamers or substrate wetting agents. Anionic, cationic, amphoteric, or nonionic surfactants may be used. Compatible mixtures of such materials are also suitable. Defoaming surfactants are often present at levels up to 1 percent, such as up to 0.1 percent by volume, and wetting agents are often present at levels up to 2 percent, such as up to 0.5 percent by volume, based on the total volume of the solution.

Exemplary nonionic surfactants that may be used include nonylphenol ethoxylate or an octylphenol ethoxylate, such as Triton™ X-100, available from Dow Chemical Corporation, or an ethoxylated alcohol, such as Tomadol 1-9 available from Air Products. An exemplary cationic surfactant that may be used is Tomamine Q-14-2, available from Air Products.

In certain embodiments, the solution utilized in certain embodiments of the present invention has a pH at application of less than about 6 (i.e., less than the upper limit of solubility of the copper compound in the solution) and more preferably less than about 4.5, and most preferably less than about 3. In certain embodiments, the pH of the solution is maintained through the inclusion of an acid. The pH of the solution may be adjusted using mineral acids, such as hydrofluoric acid, fluoroboric acid, nitric acid and phosphoric acid, including mixtures thereof; organic acids, such as lactic acid, acetic acid, citric acid, sulfuric acid, sulfamic acid, or mixtures thereof; and water soluble or water dispersible bases, such as sodium hydroxide, ammonium hydroxide, ammonia, or amines such as triethylamine, methylethyl amine, or mixtures thereof.

In still other embodiments, both a surfactant as described in the previous paragraph, and an acid as described above may be included in the solution to form the solution having a pH at application of less than about 5, or more preferably less than about 4.5, or most preferably less than about 3.

In a preferred embodiment, the solution includes a water soluble copper compound, phosphoric acid, and a non-ionic surfactant and has a pH of about 3. In these preferred embodiments, the water soluble copper compound, preferably copper nitrate or copper sulfate, has a copper content of about 5 to 100 ppm in the solution, based on the total weight of ingredients in the solution.

Electrodepositable Coating Composition

The present invention is also directed to the subsequent coating of the substrate material with an electrodepositable coating composition including (i) a film-forming compound and (ii) a source of yttrium. In certain embodiments, the electrodepositable coating composition may be formed in accordance with U.S. patent application Ser. No. 12/693,626, which is herein incorporated by reference, and may also include (iii) a silane that does not contain an ethylenically unsaturated double bond. In certain embodiments, the coating composition may be formed in accordance with U.S. patent application Ser. No. 12/693,626 and may further also include (iii) an aminosilane, which could or could not contain an ethylenically unsaturated double bond.

In some embodiments, when the film-forming polymer comprises a reactive functional group, the coating composition further comprises (iv) a curing agent that is reactive with a reactive functional group of the film-forming polymer.

A wide variety of film-forming polymers, which are known in the art, can be used as component (i) so long as the polymers are "water dispersible." As used herein, "water dispersible" means that a material is adapted to be solubilized, dispersed, and/or emulsified in water. The film-forming polymers used in the present invention are ionic in nature. Accordingly, in some embodiments, the film-forming polymer is cationic. In other words, the film-forming polymer comprises cationic salt groups, generally prepared by neutralizing a functional group on the film-forming polymer with an acid, which enables the film-forming polymer to be electrodeposited onto a cathode.

Examples of film-forming polymers suitable for use in cationic electrocoating coating compositions include, without limitation, cationic polymers derived from a polyepoxide, an acrylic, a polyurethane, and/or polyester. In certain embodiments, the film-forming polymer comprises reactive functional groups. As used herein, the phrase "reactive functional group" means hydroxyl, carboxyl, carbamate, epoxy, isocyanate, aceto acetate, amine-salt, mercaptan, or combinations thereof. It should be noted that in some embodiments, the film-forming polymer is a copolymer of the polymers listed in the preceding sentence. In some embodiments, the cationic polymer can be derived by reacting a polyepoxide containing polymer with a cationic salt group former. As used herein, "cationic salt group former" means a material that is reactive with epoxy groups and which can be acidified before, during, or after reaction with the epoxy groups to form cationic salt groups. Suitable materials that can be used as the cationic salt group former include amines such as primary or secondary amines, which can be acidified after reaction with the epoxy groups to form amine salt groups, or tertiary amines, which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

In certain embodiments, the film-forming polymer (i) that is used in the present invention comprises the reaction product of an epoxy functional compound (e.g., EPON 880) and a phenolic hydroxyl group-containing material such as bisphenol A, which is a polyhydric phenol. In some embodiments, the film-forming polymer (i) described in the preceding sentence can be reacted with an amine, such as aminopropyldiethanolamine (APDEA) and dimethylaminopropylamine (DMAPA), in order to make the film-forming polymer water dispersible. In certain embodiments, ketimine can be reacted with the backbone of the film-forming polymer thereby forming ketimine arms that extend pendant to the backbone. When the polymer is dispersed in a water/acid mixture, the ketimine arms will hydrolyze and form primary amines. Accordingly, in some embodiments, the electrodepositable coating compositions that are disclosed in U.S. Pat. Nos. 5,633,297, 5,820,987, and/or 5,936,012 can be used with the present invention.

Various yttrium compounds may be used as component (ii) in the present invention. For example, the yttrium compounds may include, without limitation, yttrium formate, yttrium acetate, yttrium lactate, yttrium sulfamate, yttrium methane sulfonate, or combinations thereof. In some embodiments, yttrium comprises ≤5 weight % of the total resin solids of the electrodepositable coating composition. In other embodiments, yttrium comprises ≥0.15 weight % of the total resin solids of the electrodepositable coating composition. In certain embodiments, the amount of yttrium can range between any combination of values, which were recited in the preceding sentences, inclusive of the recited values. For example, in certain embodiments, the amount of yttrium can range from 0.20 weight % to 2 weight % of the total resin solids of the electrodepositable coating composition.

If (i) the film-forming polymer comprises reactive functional groups, such as those described above, then the electrodepositable coating composition may further comprise (iv) a crosslinking agent ("curing agent") that is reactive with the reactive functional groups of the polymer. Suitable crosslinking agents include, without limitation, aminoplasts, polyisocyanates (including blocked isocyanates), polyepoxides, beta-hydroxyalkylamides, polyacids, anhydrides, organometallic acid-functional materials, polyamines, polyamides, cyclic carbonates, siloxanes, or combinations thereof. In some embodiments, the curing agent can comprise from 30 weight % to 40 weight % of the total resin solids of the coating composition.

In certain embodiments, the electrodepositable coating composition may further comprise (v) a curing catalyst, which may be used to catalyze the reaction between the crosslinking agent and the reactive functional groups of the film-forming polymer. Suitable curing catalysts that may be used as component (v) include, without limitation, organotin compounds (e.g., dibutyltin oxide, dioctyltin oxide) and salts thereof (e.g., dibutyltin diacetate); other metal oxides (e.g., oxides of cerium, zirconium and/or bismuth) and salts thereof (e.g., bismuth sulfamate and/or bismuth lactate), bicyclic guanidine (as disclosed in U.S. patent application Ser. No. 11/835,600), or combinations thereof.

The electrodepositable coating composition disclosed herein is typically supplied as two components: (1) a main vehicle ("clear resin feed") and (2) a grind vehicle ("pigment paste"). In general, (1) the main vehicle comprises (a) a film-forming polymer ("an active hydrogen-containing ionic salt group-containing resin"), (b) a crosslinking agent, and (c) any additional water-dispersible, non-pigmented components (e.g., catalysts, hindered amine light stabilizers). In general, (2) the grind vehicle comprises (d) one or more pigments (e.g., titanium dioxide, carbon black), (e) a water-dispersible grind resin, which can be the same or different from the film-forming polymer, and, optionally, (f) additives such as catalysts, antioxidants, biocides, defoamers, surfactants, wetting agents, dispersing aids, clays, hindered amine light stabilizers, UV light absorbers and stabilizers, or combinations thereof. An electrodeposition bath, which contains the electrodepositable coating composition of the present invention, can be prepared by dispersing components (1) and (2) in an aqueous medium which comprises water and, usually, coalescing solvents. The (ii) yttrium and/or the (iii) silane, which are used in the electrodepositable coating composition of the present invention, may be incorporated into the main vehicle, the grind vehicle, or post-added to a bath that is prepared with components (1) and (2). Alternatively, components (1) and (2) may also be provided as a single component.

Electrodepositable Coating System

The electrodepositable coating composition described herein may be applied alone or as part of a coating system that can be deposited onto a number of different substrates. The coating system typically comprises a number of coating layers. A coating layer is typically formed when a coating composition that is deposited onto the substrate is substantially cured by methods known in the art (e.g., by thermal heating).

After the electrodepositable coating composition is cured, a primer-surfacer coating composition is applied onto at least a portion of the electrodepositable coating composition. The primer-surfacer coating composition is typically applied to the electrodepositable coating layer and cured prior to a subsequent coating composition being applied over the primer-surfacer coating composition.

The primer-surfacer layer that results from the primer-surfacer coating composition serves to enhance chip resistance of the coating system as well as aid in the appearance of subsequently applied layers (e.g., color imparting coating composition and/or substantially clear coating composition). As used herein, "primer-surfacer" refers to a primer composition for use under a subsequently applied coating composition, and includes such materials as thermoplastic and/or crosslinking (e.g., thermosetting) film-forming resins generally known in the art of organic coating compositions. Suitable primers and primer-surfacer coating compositions include spray applied primers, as are known to those skilled in the art. Examples of suitable primers include several available from PPG Industries, Inc., Pittsburgh, Pa., as DPX-1791, DPX-1804, DSPX-1537, GPXH-5379, OPP-2645, PCV-70118, and 1177-225A. Another suitable primer-surfacer coating composition that can be utilized in the present invention is the primer-surfacer described in U.S. patent application Ser. No. 11/773,482, which is incorporated in its entirety herein by reference.

It should be noted that in some embodiments, the primer-surfacer coating composition is not used in the coating system. Therefore, a color imparting basecoat coating composition can be applied directly onto the cured electrodepositable coating composition.

In some embodiments, a color imparting coating composition (hereinafter, "basecoat") is deposited onto at least a portion of the primer surfacer coating layer (if present). Any basecoat coating composition known in the art may be used in the present invention. It should be noted that these basecoat coating compositions typically comprise a colorant.

In certain embodiments, a substantially clear coating composition (hereinafter, "clearcoat") is deposited onto at least a portion of the basecoat coating layer. As used herein, a "substantially clear" coating layer is substantially transparent and not opaque. In certain embodiments, the substantially clear coating composition can comprise a colorant but not in an amount such as to render the clear coating composition opaque (not substantially transparent) after it has been cured. Any clearcoat coating composition known in the art may be used in the present invention. For example, the clearcoat coating composition that is described in U.S. Pat. Nos. 5,989,642, 6,245,855, 6,387,519, and 7,005,472, which are incorporated in their entirety herein by reference, can be used in the coating system. In certain embodiments, the substantially clear coating composition can also comprise a particle, such as a silica particle, that is dispersed in the clearcoat coating composition (such as at the surface of the clearcoat coating composition after curing).

One or more of the coating compositions described herein can comprise colorants and/or other optional materials, which are known in the art of formulated surface coatings. As used herein, the term "colorant" means any substance that imparts color and/or other opacity and/or other visual effect to the composition. The colorant can be added to the coating in any suitable form, such as discrete particles, dispersions, solutions and/or flakes (e.g., aluminum flakes). A single colorant or a mixture of two or more colorants can be used in the coating composition described herein.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which discreet "composite microparticles", which comprise a nanoparticle and a resin coating on the nanoparticle, is dispersed. Example dispersions of resin-coated nanoparticles and methods for making them are identified in U.S. Patent Publication No. 2005/0287348, filed Jun. 24, 2004, U.S. Provisional Application No. 60/482,167 filed Jun. 24, 2003, and U.S. patent application Ser. No. 11/337,062, filed Jan. 20, 2006, which are also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating composition described herein. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/ or at least partially bound to a polymer and/or polymerizable component in accordance with a non-limiting embodiment of the present invention, have minimal migration out of the coating. Example photosensitive compositions and/or photochromic compositions and methods for making them are identified in U.S. patent application Ser. No. 10/892,919, filed Jul. 16, 2004.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

In addition to the materials described above, the coating composition can also comprise an organic solvent. Suitable organic solvents that can be used in the coating composition include any of those listed in the preceding paragraphs as well as butyl acetate, xylene, methyl ethyl ketone, or combinations thereof.

It will be further appreciated that one or more of the coating compositions that form the various coating layers described herein can be either "one component" ("1K"), "two component" ("2K"), or even multi-component compositions. A 1K composition will be understood as referring to a composition wherein all of the coating components are maintained in the same container after manufacture, during storage, etc. A 2K composition or multi-component composition will be understood as referring to a composition wherein various components are maintained separately until just prior to application. A 1K or 2K coating composition can be applied to a substrate and cured by any conventional means, such as by heating, forced air, and the like.

The coating compositions that form the various coating layers described herein can be deposited or applied onto the substrate using any technique that is known in the art. For example, the coating compositions can be applied to the substrate by any of a variety of methods including, without limitation, spraying, brushing, dipping, and/or roll coating, among other methods. When a plurality of coating compositions are applied onto a substrate, it should be noted that one coating composition may be applied onto at least a portion of an underlying coating composition either after the underlying coating composition has been cured or prior to the underlying coating composition being cured. If the coating composition is applied onto an underlying coating composition that has not been cured, both coating compositions may be cured simultaneously.

The coating compositions may be cured using any technique known in the art such as, without limitation, thermal energy, infrared, ionizing or actinic radiation, or by any combination thereof. In certain embodiments, the curing operation can be carried out at temperatures≥10° C. In other embodiments, the curing operation can be carried out at temperatures≤246° C. In certain embodiments, the curing operation can carried out at temperatures ranging between any combination of values, which were recited in the preceding sentences, inclusive of the recited values. For example, the curing operation can be carried out at temperatures ranging from 120° C.-150° C. It should be noted, however, that lower or higher temperatures may be used as necessary to activate the curing mechanisms.

In certain embodiments, one or more of the coating compositions described herein is a low temperature, moisture curable coating compositions. As used herein, the term "low temperature, moisture curable" refers to coating compositions that, following application to a substrate, are capable of curing in the presence of ambient air, the air having a relative humidity of 10% to 100%, such as 25% to 80%, and a temperature in the range of −10° C. to 120° C., such as 5° C. to 80° C., in some cases 10° C. to 60° C. and, in yet other cases, 15° C. to 40° C.

The dry film thickness of the coating layers described herein can range from 0.1 micron to 500 microns. In other embodiments, the dry film thickness can be ≤125 microns, such as ≤80 microns. For example, the dry film thickness can range from 15 microns to 60 microns.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Example A

Cationic Resin A: A cationic resin was prepared from a mixture of the following ingredients: 1039.8 g of crosslinker 1 (see description below), 55.0 g of Macol 98 B (Bisphenol A-6 ethylene oxide polyol available from BASF Corporation), 69.6 g of diethylene glycol mono butyl ether formal, 528.7 g Epon 828 (Epoxy resin available from Resolution Performance Products), 203.9 g bisphenol A, and 0.18 g Tetronic 150R1 (Available from BASF Corporation), are charged to a 4 neck round bottom flask, fit with a stirrer, temperature measuring probe, $N_2$ blanket and Dean-Stark trap. The mixture is heated to 75° C. and 34.7 g of diethanolamine is added. The mixture exotherms to ~80° C. and is held for 30 minutes after the addition of the diethanolamine. 80.3 g of aminopropyl diethanolamine is added, the temperature is adjusted to 132° C. and the mixture is then held at this temperature for 2 hours while collecting approximately 30 g of solvent in the Dean-Stark trap. 1680 g of this mixture is poured into a mixture of 30.5 g sulfamic acid, 1181 g deionized water, 1.15 g 88% lactic acid and 66.3 g of additive resin 1 (description below). The mixture is stirred for 30 minutes. 1183 g of deionized water is added and mixed in well. 1000 g of deionized water is added and mixed in well. Solvent and water are removed by vacuum distillation, the solids of the resulting aqueous dispersion is adjusted to 39%. The methylisobutyl ketone content of the dispersion is less than 0.2%.

Crosslinker 1 is prepared by adding 1320 g (10 eq.) of Desmodur LS 2096 (MDI type isocyanate available from Bayer Corporation) to a mixture of 92 g ethanol, 456 g propylene glycol, 740 g Macol 98 B (see above), and 486 g diethylene glycol mono butyl ether formal and 93 g methylisobutyl ketone. 68 g of methylisobutyl ketone is used as a rinse for the isocyanate. The temperature is allowed to increase to 115° C. and the mixture is held until the infrared spectrum indicates the absence of isocyanate.

Description of Additive Resin 1

| 1 | MAZEEN 355 70[1]       | 1423.49 |
|---|------------------------|---------|
| 2 | acetic acid            | 15.12   |
| 3 | Dibutyltindilaurate    | 1.52    |
| 4 | Toluene diisocyanate 80/20 | 200.50 |
| 5 | sulfamic acid          | 79.73   |
| 6 | deionized H2O          | 1623.68 |
| 7 | deionized H2O          | 766.89  |

[1]Amine functional diol of amine equivalent weight 1131 available from BASF Corporation Items 1 and 2 are charged to a 4 neck round bottom flask, fit with a stirrer, temperature measuring probe and $N_2$ blanket and mixed for 10 minutes. Item 3 is added and then item 4 is charged over about 1 hour allowing the reaction mixture to exotherm to a maximum temperature of 100° C. The mixture is then held at 100° C. until the infrared spectrum indicates the absence of isocyanate (approximately 1 hour). 1395 g of the reaction mixture is poured into a mixture of items 5 and 6 and mixed for 1 hour. Item 7 is then added over about 1 hour and mixed for about 1 hour. The resulting aqueous solution (additive resin 1) had a solids content of about 36%.

Example B

Grind Resin: This example describes the preparation of a quaternary ammonium salt containing pigment-grinding resin. Example B-1 describes the preparation of an amine-acid salt quaternizing agent and Example B-2 describes the preparation of an epoxy group-containing polymer that is subsequently quaternized with the amine-acid salt of Example B-1.

B-1 The amine-acid salt quaternizing agent was prepared using the following procedure:

| # | Material | Parts |
|---|----------|-------|
| 1 | Dimethyl ethanolamine | 445 |
| 2 | PAPI 290 available from Dow Chemical Co. | 660 |
| 3 | Butyl Carbitol Formal available from BASF Corp. | 22.1 |
| 4 | 88% lactic acid aqueous | 512 |
| 5 | DI water | 2136.11 |

Material 1 was charged in a suitably equipped 5 liter flask. Material 2 was then charged under mild agitation over a 1.5 hour period, followed by a rinse of material 3. During this addition, the reaction mixture was allowed to exotherm to a temperature of about 89° C. and held at that temperature for about 1 hour until complete reaction of the isocyanate as determined by infrared spectroscopy. At that time, material 4 was added over a 25 minute period, followed material 5. The reaction temperature was held at about 80° C. for about 6 hours until a stalled acid value of 70.6 was obtained.

B-2 The quaternary ammonium salt group-containing polymer was prepared using the following procedure.

| # | Material | Parts |
|---|----------|-------|
| 1 | Bisphenol A Diglycidyl ether available from Resolution Chemical Co. as Epon 828 | 528.8 |
| 2 | Bisphenol A | 224.9 |
| 3 | Butyl Carbitol Formal | 83.7 |
| 4 | ethyltriphenylphosphonium iodide | 0.5 |
| 5 | Butyl Carbitol Formal | 164.9 |
| 6 | amine -acid quaternizing agent of B-1 | 418.4 |
| 7 | DI water | 1428.1 |
| 8 | Butyl Carbitol Formal | 334.7 |

Material 1 was charged to a suitably equipped 5 liter flask under mild agitation. Material 2 was then added followed by material 3 and material 4. The reaction mixture was heated to about 140° C., allowed to exotherm to about 180° C., then cooled to about 160° C. and held at that temperature for about 1 hour. At that time the polymeric product had an epoxy equivalent weight of 982.9. The reaction mixture was then cooled to a temperature of about 130° C. at which time material 5 was added and the temperature lowered to about 95°-100° C., followed by the addition of material 6, the amine-acid quaternizing agent of 6-1 over a period of 15 minutes, and subsequently followed by the addition of about 1428.1 parts by weight of deionized water. The reaction temperature was held at about 80° C. for approximately 6 hours until the acid number of the reaction product fell below 1.0. The resultant quaternary ammonium salt group-containing pigment grinding resin was further reduced with about 334.7 parts by weight of the solvent of Butyl Carbitol Formal.

Example C

Pigment Paste: This example describes the preparation of a pigment paste suitable for use in the electrodeposition bath compositions of the present invention.

The pigment paste was prepared with the following ingredients:

| Weight (grams) | Material |
|---|---|
| 988.1 | Quaternary ammonium salt group containing grind resin of Example B |
| 518.2 | Catalyst paste[1] |
| 50.3 | Surfynol GA surfactant from Air Products & Chemicals Inc. |
| 24.4 | Ethylene Glycol Monohexylether from BASF Corp. |
| 24.4 | N-Butoxypropanol from Dow Chemical Co. |
| 13.0 | Carbon black available from Printex 200 |
| 389.0 | Aluminum silicate clay available from BASF Catalysts LLC |
| 727.8 | Titanium Dioxide from Tronox Inc. |
| 265.0 | DI water |

[1]Prepared from a mixture of the following ingredients: 632 grams: Quaternary ammonium salt group containing grind resin of Example C; 92 grams of DI water; 19 grams of n-Butoxypropanol; and 368 grams of STANN BO (Di-n-butyltin oxide catalyst available from Sankyo Organic Chemicals Co., Ltd.). The above ingredients were added in the order shown under high shear agitation. After ingredients were thoroughly blended, the pigment paste was transferred to a vertical sand mill and ground to a Hegman value of about 7.25.

The above ingredients were first dispersed with a high speed cowles blade for 30 minutes, and then milled in a Premier Mill with 1.0-1.6 mm Zircoa media for 1 hour or until Hegman value reaches about 7.

Example D

Resin Blend 1: This example describes the preparation of a master batch of the resin blend that was used in the Paints 1 and 2 below.

| Weight (grams) | Material |
|---|---|
| 1534.1 | Cationic resin from Example A |
| 115.8 | Flexiblizer[1] |
| 20.3 | Plasticizer[2] |
| 7.5 | Proplyene Glycol monomethyl ether from BASF Corp. |
| 3.8 | Ethylene Glycol Monohexylether from BASF Corp. |
| 75.1 | Flow additive[3] |

[1]711 g of DER732 (Aliphatic epoxy resin available from Dow Chemical Co.) and 164.5 g bisphenol A are charged to a suitably equipped 3-liter round-bottomed flask. The mixture is heated to 130° C. and 1.65 g benzyldimethyl amine is added. The reaction mixture is held at 135° C. until the epoxy equivalent weight of the mixture is 1232. 78.8 g of butyl Carbitol formal (Available as Mazon 1651 from BASF Corporation) is added and then the mixture is cooled to 95° C. 184.7 g Jeffamine D400 (Polyoxypropylene diamine available from Huntsman Corp.) is added and the reaction held at 95° C. until the Gardner-Holdt viscosity of a sample of the resin diluted 50/50 in methoxy propanol is "HJ". A mixture of 19.1 g Epon 828 and 3.4 g butyl Carbitol formal is added and the mixture held until the Gardner-Holdt viscosity of a sample of the resin diluted 50/50 in methoxy propanol is "Q-". 988.6 g of this resin is poured into a mixture of 1242.13 g deionized water and 30.2 g sulfamic acid and mixed for 30 minutes. 614.8 g deionized water is then added and mixed well. The final aqueous dispersion had a measured solids content of 35.8%.
[2]Reaction product of 2 moles of diethylene glycol monobutyl ether and 1 mole formaldehyde, 98% active, prepared as described in U.S. Pat. No. 4,891,111 to McCollum et al.
[3]Prepared by a process comprising mixing a cationic polyepoxideamine reaction product and a polyepoxide crosslinking agent as described in U.S. Pat. No. 5,096,556 to Corrigan et al.

Example E

Yttrium Solution: This example describes the preparation of a soluble yttrium solution for use in the electrodeposition bath composition of Paint 1 in Table 1. The soluble yttrium solution was prepared from a mixture of the following:

| Weight (grams) | Material |
|---|---|
| 112.9 | Yttrium Trioxide |
| 485.0 | DI water |
| 291.3 | Sulfamic Acid |

To a suitably equipped 5 liter flask add sulfamic acid and water and stir for 20 minutes. Heat solution to 98° C. and then hold until a clear solution is obtained. Hold for at least 2 hours. Allow solution to cool below 50° C.

Example F

Silane Solution 1: This example describes the preparation of an amino silane solution that is suitable for use in the electrodeposition bath compositions of Paints 1, 2, and 3 in Table 1.

| Weight (grams) | Material |
|---|---|
| 150.0 | DI water |
| 30.2 | Aminopropylsilesquioxane from Gelest, Inc. as WSA-9911 |

Combine the above ingredients and allow to mix for 20 minutes. After 20 minutes, add 88% lactic acid until pH reaches about 5.5.

The following table provides the preparation of electrodeposition bath compositions of the invention:

TABLE 1

| Paint | Resin Blend (grams) from Ex. D | Pigment Paste (grams) from Ex. C | DI Water (grams) | Yttrium Soln. (grams) from Ex. E | Silane Soln. (grams) from Ex. F |
|---|---|---|---|---|---|
| 1 | 1756.6 | 238.3 | 1748.6 | 32.7 | 14.3 |
| 2 | 1756.6 | 238.3 | 1781.3 | 0 | 14.3 |

Paints 1 and 2 were made by adding the cationic resin blend from Example D into a 1 gallon plastic container. The pigment paste of Example C is then diluted with about 200 grams of the DI water before adding it to the resin blend. If noted in the table above, the silane solution was diluted with about 20 grams of DI water prior to addition. If noted in the table above, the yttrium solution was diluted with about 50 grams of DI water prior to addition. The remaining DI water is then added to the container. Final bath solids were about 21.5%, with a pigment to binder ratio of about 0.14. The test baths were ultrafiltered 30% and replenished with only fresh DI water.

The above paint compositions were compared as described in the examples below. The test substrate was 4"×6" ACT CRS panels available from ACT Laboratories of Hillside, Mich.

Each of the electrodeposition bath compositions in Table 1 above were electrodeposited onto the cleaned and/or rinsed cold rolled steel panels according to that described in Table 2. Conditions for cationic electrodepositions of each were as follows: 20-70 coulombs, 150-200 volts, at 90° F. to yield a cured film thickness of 0.8-1.0 mils. The coated substrate was cured in an electric oven at 350° F. for 20 minutes.

Example G

Copper (II) Nitrate Solution: This example describes the preparation of a 2% copper solution for use in preparing the copper rinse baths in Examples H & I below. The soluble copper solution was prepared by dissolving 14.65 g copper (II) nitrate in 200 g DI water.

Example H

A copper rinse suitable for treating panels as described in Table 2 below was prepared by diluting 23.75 g of the copper solution of Example G with 18976.25 g DI water.

Example I

Acidic copper containing solution: This example describes the preparation of a copper prerinse solution for use in treating panels as described in Table 2 below. This solution was prepared by diluting 24.9 grams of 85% phosphoric acid, 1.17 grams of 70% nitric acid, 9.1 grams of Triton™ X-100 (available from The Dow Chemical Company) and 6.4 grams of Triton CF-10 (available from The Dow Chemical Company) to 2400 grams deionized water and then neutralizing to pH 3.0 with Chemfil Buffer (available from PPG Industries), and then adding 3.01 g copper (II) nitrate solution of Example G.

Example J

CRS panels were cleaned by spraying with a solution of Chemkleen 166 m/c, an alkaline cleaner available from PPG Industries, for two minutes at 60° C. (140° F.). After alkaline cleaning, the panels were rinsed thoroughly with deionized water. Some of the panels were immersed in the copper solution described in Example H for two minutes at 120 F followed by thoroughly rinsing with deionized water. Some of the other panels were immersed in the copper solution described in Example I for two minutes at 120 F followed by thoroughly rinsing with deionized water. All panels were then dried with a warm air blowoff. Panels were then electrocoated and baked according to the conditions described above with either Paint 1 or 2. After coating, panels were tested for corrosion resistance by subjecting them to GM 9540-P ("Cycle B"), a cyclical corrosion test for 40 cycles. After testing, the panels were media-blasted to remove loose paint and corrosion products, and the paint loss from the scribe (creep) was measured and the average calculated in millimeters for each panel. Results appear in Table 2 below:

TABLE 2

| Example | Copper Rinse Used | Electrocoat Used | Cycle B Average Creep (mm) |
| --- | --- | --- | --- |
| 4 | None | Paint 1 (w/Yttrium) | 9.9 |
| 5 | Ex. H | Paint 1 (w/Yttrium) | 6.5 |
| 6 | Ex. I | Paint 1 (w/Yttrium) | 3.6 |
| 7 | Ex. H | Paint 2 (No Yttrium) | 12.4 |
| 8 | Ex. I | Paint 2 (No Yttrium) | 9.5 |

A zinc-phosphated CRS panel with a deionized water post rinse, electrocoated with Paints 1 or 2 typically has 3-5 mm of scribe creep after 40 cycles of Cycle B testing.

What is claimed:

1. A method comprising:
   (a) contacting at least a portion of a substrate with a solution comprising a source of copper, wherein the solution is essentially free of a source of a group IIIB metal and a source of a group IVB metal; and
   (b) after step (a), contacting at least a portion of the substrate with an electrodepositable coating composition with no pretreatment step performed between steps (a) and (b), the electrodepositable coating composition comprising:
      (i) a film-forming resin; and
      (ii) a source of yttrium.

2. The method of claim 1, wherein the solution comprising a source of copper comprises a water soluble copper compound dissolved in water.

3. The method of claim 2, where the water soluble copper compound comprises copper nitrate and/or copper sulfate.

4. The method of claim 1, wherein the solution has a pH of 6 or less.

5. The method of claim 1, where the solution comprising a source of copper further comprises an acid.

6. The method of claim 5, wherein the acid comprises a mineral acid.

7. The method of claim 6, wherein the mineral acid comprises phosphoric acid.

8. The method of claim 1, wherein the solution comprising a source of copper further comprises a surfactant.

9. The method of claim 8, wherein the surfactant comprises a non-ionic surfactant.

10. The method of claim 9, wherein said non-ionic surfactant comprises octylphenyl ethoxylate.

11. The method of claim 1, wherein the solution comprising a source of copper further comprises phosphoric acid and a surfactant.

12. The method of claim 2, wherein copper is included in the solution in an amount between about 5 to about 100 parts per million of total copper measured as elemental copper, based on the total weight of the ingredients in the solution.

13. The method of claim 1 further comprising contacting at least a portion of the substrate with an alkaline cleaning solution prior to contacting the substrate material with the solution comprising a source of copper.

14. The method of claim 1, wherein said substrate comprises a metal, a metal alloy, or a substrate that has been metallized.

15. The method of claim 14, wherein the metal alloy comprises cold rolled steel.

16. The method of claim 1, wherein the electrodepositable coating composition further comprises a source of silane.

17. A coated substrate formed in accordance with the method of claim 1.

18. A method comprising:
   (a) contacting at least a portion of a substrate with a solution consisting essentially of:
      (i) a source of copper;
      (ii) water; and
      (iii) at least one of an acid and a surfactant;
   (b) after step (a), contacting at least a portion of the substrate with an electrodepositable coating composition with no pretreatment step performed between steps (a) and (b), the electrodepositable coating composition comprising:
      (i) a film-forming resin; and
      (ii) a source of yttrium.

19. The method of claim 18, wherein the solution has a pH of 6 or less.

20. The method of claim 18, wherein copper is included in the solution in an amount between about 5 to about 100 parts per million of total copper measured as elemental copper, based on the total weight of the ingredients in the solution.

\* \* \* \* \*